United States Patent [19]

Matsuo et al.

[11] 4,368,698
[45] Jan. 18, 1983

[54] INTAKE SYSTEM FOR INTERNAL COMBUSTION ENGINES

[75] Inventors: Noritaka Matsuo; Kohichiro Takeuchi, both of Iwata; Tokuzi Muramatsu, Hamakita, all of Japan

[73] Assignee: Yamaha Hatsudoki Kabushiki Kaisha, Iwata, Japan

[21] Appl. No.: 264,056

[22] Filed: May 15, 1981

[30] Foreign Application Priority Data

Jun. 28, 1980 [JP] Japan .................................. 55-88285

[51] Int. Cl.$^3$ ........................ F02B 75/18; F02B 33/07
[52] U.S. Cl. ........................... 123/52 M; 123/52 MB; 123/52 MF; 123/65 WV; 123/73 A
[58] Field of Search .......... 123/52 MB, 52 MF, 65 E, 123/65 WV, 52 M, 73 R, 73 A

[56] References Cited

U.S. PATENT DOCUMENTS

| 1,632,880 | 6/1927 | Burtnett | 123/52 MB |
| 2,080,293 | 5/1937 | Whatmough | 123/52 MB |
| 3,990,414 | 11/1976 | Malphettes | 123/52 MB |
| 4,231,329 | 11/1980 | Ishida | 123/52 MB |
| 4,240,387 | 12/1980 | Motosugi et al. | 123/52 MB |

Primary Examiner—Wendell E. Burns
Attorney, Agent, or Firm—Ernest A. Beutler

[57] ABSTRACT

Several embodiments of induction systems for internal combustion engines that improve charging efficiency over a widespread range, particularly at the lower speeds of the engine. Each embodiment includes a plurality of plenum chambers each of which communicates with the intake passage of the engine between the throttle valve and the served chamber. In one embodiment, the plenum chambers communicate with the induction system through separate branch passages. In other embodiments, the plenum chambers communicate with the induction system through each other.

34 Claims, 3 Drawing Figures

INTAKE SYSTEM FOR INTERNAL COMBUSTION ENGINES

BACKGROUND OF THE INVENTION

This invention relates to an intake system for internal combustion engines and more particularly to an induction system that improves the running characteristics of the engine throughout the speed range and particularly at low and medium speeds.

It is generally well recognized that the running characteristics of an internal combustion engine are not particularly good at low and medium speeds, particularly if the engine is designed to achieve maximum output at the higher ends of the engine performance. One of the disadvantages of achieving smooth running and good performance at lower engine speeds is the difficulty in fully charging the chambers of the engine. Regardless of whether the engine is valved or ported, the intake charge does not flow continuously through the induction system during engine running. That is, when the intake valve or intake port is closed, the intake charge is temporarily stopped from flowing in the intake passage. When the intake valve or port again opens, the charge must be reaccelerated to induct it into the engine. This intermittent flow through the intake system results in poor charging efficiency at lower engine speeds. As the speed of the engine increases, there is a greater tendency to establish more uniform flow through the intake system and the aforenoted deleterious effects are not as noticeable.

The opening and closing of the communication of the induction system with the engine chamber which it serves also gives rise to pressure variations in the induction system. That is, when the intake is closed there will be a pressure build-up due to the inertia of the charge flowing through the intake passage. At certain engine speeds these pulsations in induction system pressure may be utilized to improve charging efficiency. That is, during times when there is a large pressure build-up subsequent opening of the intake valve will cause good charging as the high pressure inlet charge tends to force itself into the chamber. However, this characteristic is enjoyed only at certain speed ranges and at other speed ranges the pulsations will, in effect, reduce charging efficiency.

Recently, it has been discovered that the charging efficiency, particularly at lower engine speeds, can be improved by providing a plenum chamber which is in communication with the induction system between the throttle valve and the point of discharge at the induction system into the engine chamber. The use of such a plenum chamber permits the continued flow of intake charge even after the intake valve or intake port has been closed since a vacuum will have been exerted in the plenum chamber which permits the continued flow of intake charge. The volume and relationship of that volume to the induction system can be employed to tune and improve charging efficiency at certain speed ranges. However, even though such an arrangement significantly improves charging efficiency it is an object of this invention to provide an arrangement of this type which will still further improve charging efficiency over a wider range of engine speeds.

It is, therefore, a principal object of this invention to provide an induction system for an internal combustion engine that promotes charging efficiency over a wide range of engine speeds and loads.

SUMMARY OF THE INVENTION

This invention is adapted to be embodied in an induction system for an internal combustion engine having a chamber of variable volume, intake passage means for delivering a charge to the chamber, and throttle valve means for controlling the flow to the chamber through the intake passage. In accordance with this invention, first and second plenum chambers are provided and branch passage means interconnect the plenum chambers with the intake passage between the throttle valve and the variable volume chamber.

DETAILED DESCRIPTION OF THE PREFERRED EMBODIMENTS

Figure 1:
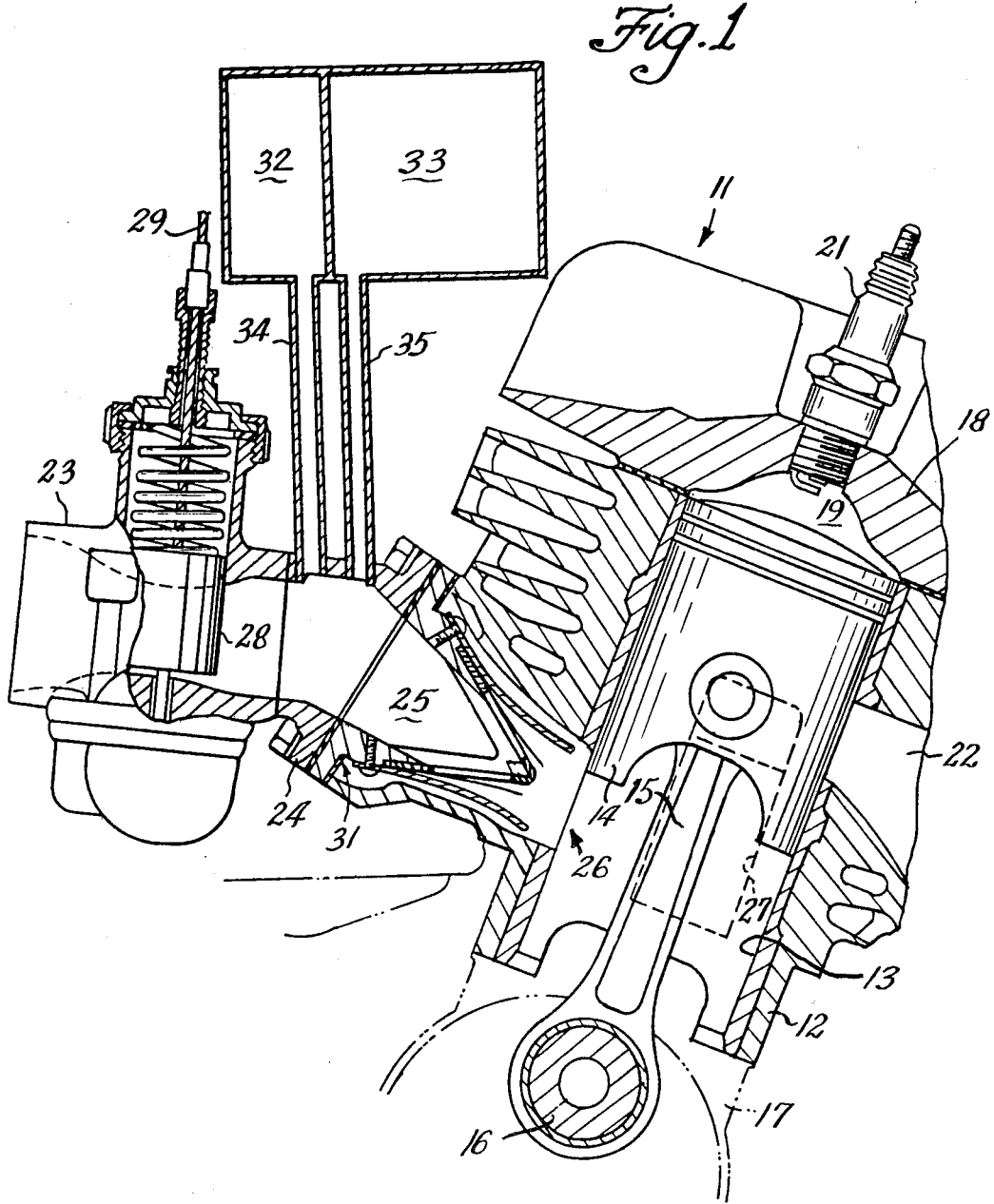
FIG. 1 is a cross-sectional view taken through a single cylinder of an internal combustion engine constructed in accordance with the first embodiment in this invention.

Referring first to the embodiment of FIG. 1, a single cylinder reciprocating two-cycle type of engine constructed in accordance with a first embodiment of this invention is identified generally by the reference numeral 11. The engine 11 includes a cylinder block 12 that defines a cylinder bore 13 in which a piston 14 reciprocates. The piston 14 is connected by means of a connecting rod 15 to a crankshaft 16 that is rotatably journeled in the crank case, indicated partially in phantom and identified by the reference numeral 17.

A cylinder head 18 is affixed to the cylinder block 12 and has a cavity 19 which cooperates with the piston 14 and cylinder bore 13 to provide a combustion chamber when the piston 14 is at top dead center.

A spark plug 21 is provided in the cylinder head 18 for firing the charge in the combustion chamber 19 at the appropriate time. The spark plug 21 may be fired in any known manner.

The spent charge from the combustion chamber 19 is discharged through an exhaust system including an exhaust port 22 that is formed in the cylinder block 12. The opening and closing of the exhaust port 22 is controlled by the reciprocation of the piston 14 as is well known in this type of invention.

A carburetor 23 of a known type supplies a fuel air charge to the engine 11 via a spacer 24 and an intake passage 25 formed in the cylinder block 13. The intake passage 25 terminates in an intake port 26 which selectively communicates with the crank case 17 during reciprocation of the piston 14. When the piston 14 is undergoing its upward travel, the volume in the crank case 17 is increased and a partial vacuum is created which causes the intake charge to flow from the carburetor 23, spacer 24 and intake passage 25 through the intake port 26 into the crank case 17. When the piston 14 moves downwardly to close the intake port 26, the charge will be compressed for eventual transfer to the combustion chamber 19 through transfer or scavenge ports 27 formed in the cylinder block 12.

The carburetor 23 is provided with a sliding piston type throttle valve 28 the position of which is controlled by the operator in any known manner, as by means of a flexible cable 29. A reed-type check valve 31 is also affixed to the cylinder block 12 in proximity to the intake passage 25. The construction of the engine thus far described is conventional and for that reason, further details have not been given.

As is well known with this type of engine, when the engine is running at low speeds the charging efficiency is deteriorated due to the successive opening and closing of the intake port 26 which causes the intake charge to develop an unsteady or pulsating flow. When the port 26 is opened, the inertia of the charge adjacent the port must be overcome before induction can commence. This invention is directed toward an arrangement for improving charging efficiency at low speeds as will now be described.

A pair of plenum chambers 32 and 33 are provided each of which communicates with the induction passage in the spacer 24 by means of a respective branch passage 34, 35. In this embodiment of the invention, the plenum chambers 32 and 33 each have a different total volume for a reason which will become apparent.

During the intake cycle of the engine when the intake port 26 is opened, there will be a reduced pressure existent in the intake passage 25 as a result of the increasing volume within the crank case 17 caused by the upward movement of the piston 14. This reduction in pressure will be transmitted to the plenum chambers 32 and 33 by the branch passages 34 and 35. Thus, when the piston 14 closes the intake port 26, there will still exist in the plenum chambers 32 and 33 a pressure that is less than atmospheric so that a flow will be established from the carburetor 23 into the plenum chambers 32 and 33 through the branch passages 34 and 35. This flow will continue until the intake port 24 is again opened by the movement of the piston 14 so that inertia of the intake charge need not be overcome when the port 26 is again re-opened. The intake to the crank case 17 will then occur both from the induction passage and also from the plenum chambers 32 and 33. The effect of the plenum chambers 32 and 33 on the induction depends upon the volume of the intake passages, the volume of the plenum chambers and the speed of the engine. By providing plenum chambers 32 and 33 of different sizes, each of which independently communicates with the induction passage, it is possible to optimize the effect of the plenum chambers on the induction cycle over a wider speed range than with construction of the type heretofore proposed for this purpose. As a result, the engine output power can be smoothly increased throughout a wide speed range and the inertia of the intake air can be effectively utilized through such wide speed ranges. The smaller volume plenum chamber 32 is effective at higher frequencies and higher engine speeds than the plenum chamber 33.

Figure 2:
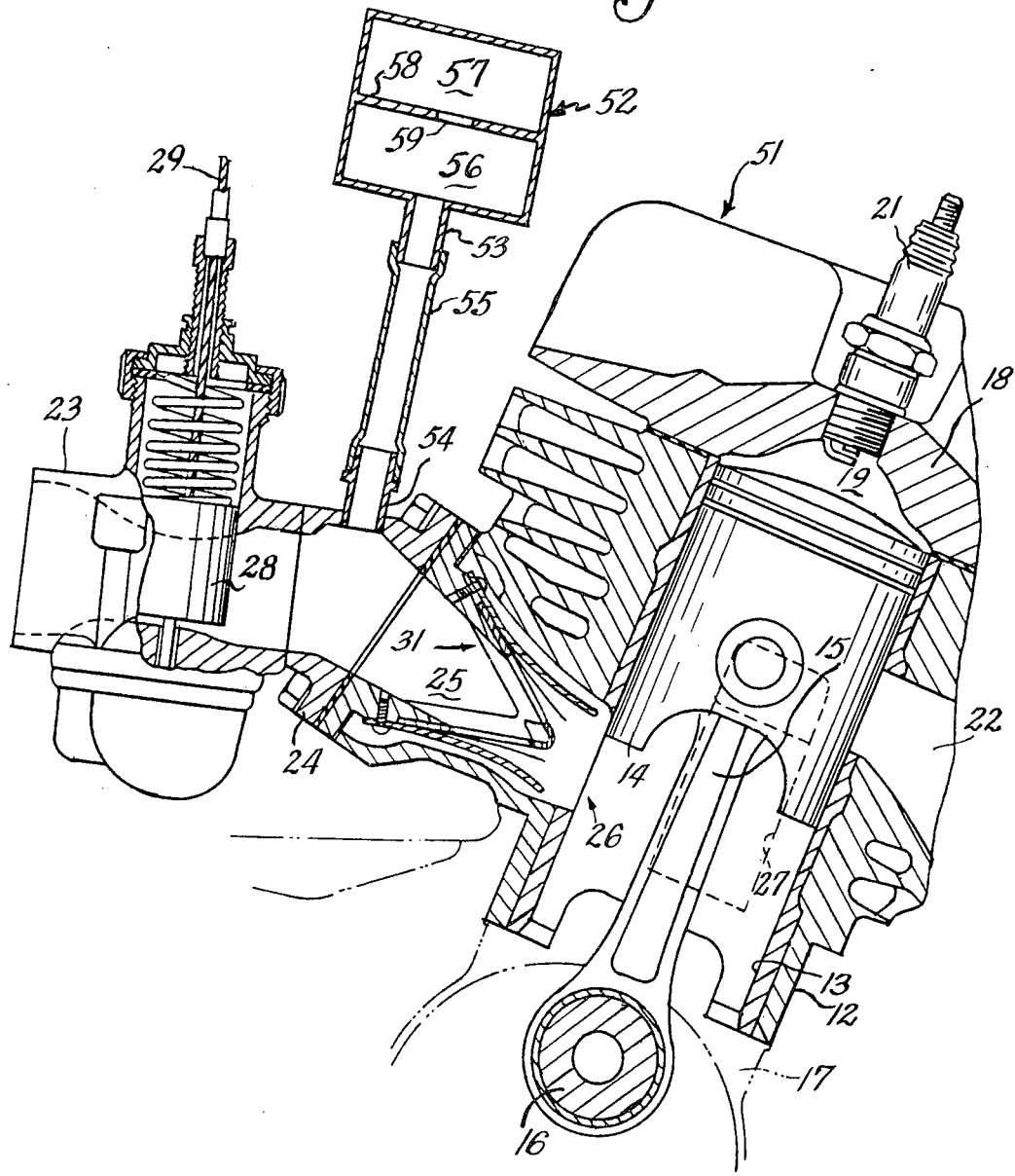
FIG. 2 is a cross-sectional view, in part similar to FIG. 1, showing another embodiment in the invention.

A second embodiment of the invention is shown in FIG. 2 wherein the engine constructed in accordance with this embodiment is identified generally by the reference numeral 51. Except for the construction of the plenum chambers and their communication with the intake system, the engine 51 is of the general construction as described in the embodiment of FIG. 1. For that reason, components which are the same have been identified by the same reference numerals and their description will not be repeated.

In this embodiment, a plenum device indicated generally by the reference numeral 52 has a nipple 53 that communicates with a pipe 54 of the spacer 22 by means of a flexible conduit 55. The plenum device 52 has an internal volume that is divided into a first chamber 56 and a second chamber 57 by means of a common wall 58. A restricted opening 59 in the wall 58 permits communication of the chambers 56 and 57 with each other.

In conjunction with the operation of this embodiment, when the engine is operating at a low speed the pulsations in the induction system will be transmitted through the pipe 54, conduit 55 and nipple 53 to the two plenum chambers 56 and 57. Under these low speed running conditions, the frequencies of the pulsations are low enough so that the size of the restriction 59 will not interfere with the communication between the two chambers 56 and 57. Thus, an effectively large volume plenum chamber is provided that effectively damps pulsations at these low engine speeds. As the speed of the engine 51 increases, the restriction 59 will progressively diminish the effect communication of the chamber 57 with the chamber 56. Thus, the effective volume of the plenum chamber in communication with the induction system will decrease as the engine speed increases to provide damping over a wide range of speeds.

Figure 3:
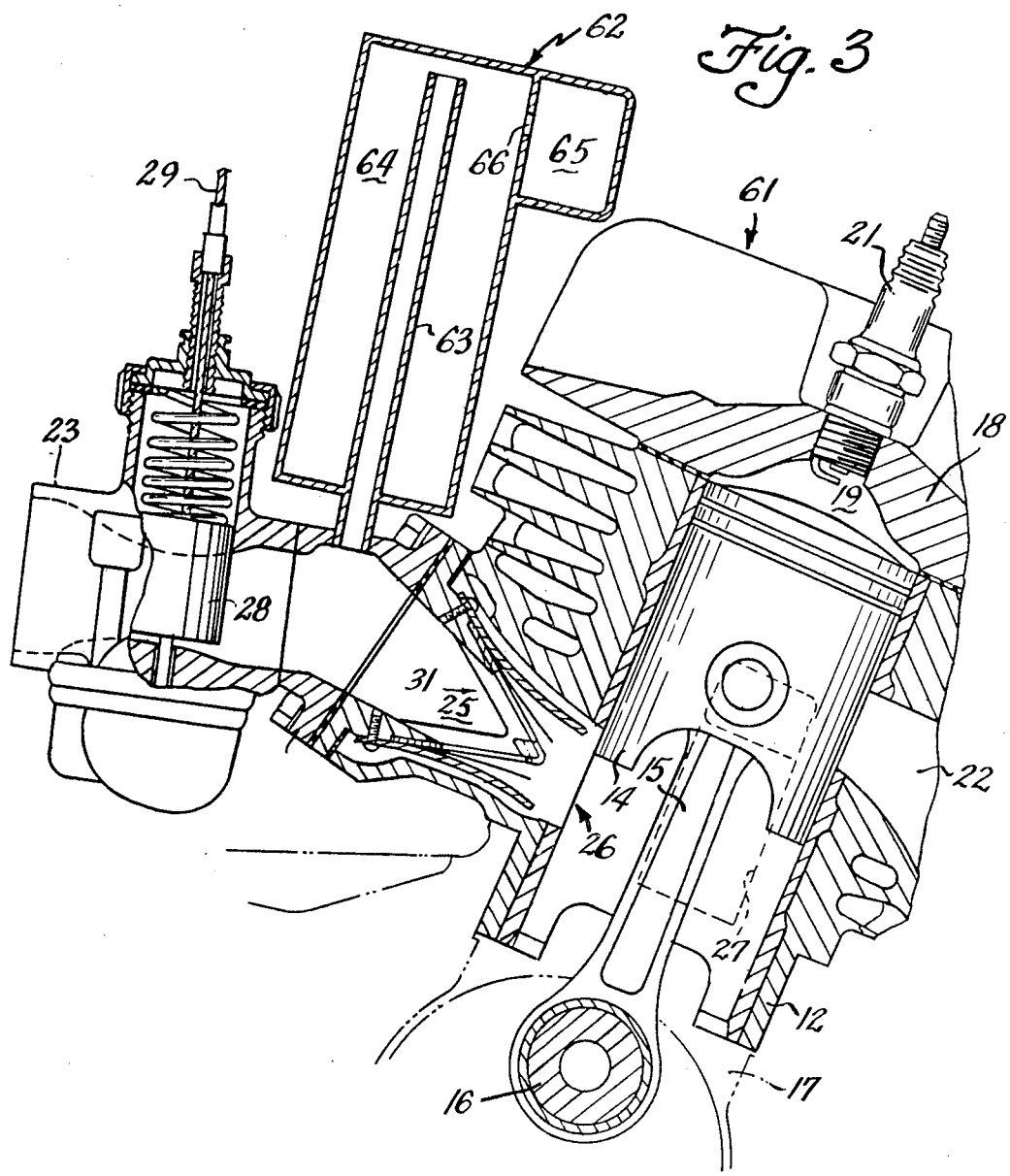
FIG. 3 is a cross-sectional view, in part similar to FIGS. 1 and 2, and shows a still further embodiment of the invention.

Referring now to the embodiment of FIG. 3, in many respects this embodiment is similar to the embodiments of FIGS. 1 and 2 already described. For this reason, those components which are the same as the embodiment of FIG. 1 have been identified by the same reference numerals and again will not be described in detail. In conjunction with this embodiment, an engine incorporating an induction system in accordance therewith is identified generally by the reference numeral 61. In conjunction with this embodiment, a plenum device, indicated generally by the reference numeral 62, is provided that communicates with the spacer 24 via an elongated conduit 63. The plenum device 62 is divided into an elongated first plenum chamber 64 that encircles the conduit 63 and which terminates at its lower end closely adjacent the spacer 24. This arrangement permits a more compact construction than in the previously described embodiment. A second plenum chamber 65 is offset to one side of the chamber 64 and communicates with the chamber 64 through a restricted passageway 66. As with the embodiment of FIG. 2, the plenum chambers 65 and 66 cooperate together to provide effective damping at low engine speeds when the pulsations have a low frequency. As the speed of the engine increases, the effect of the restriction 66 will become operative and a decrease in the effective volume of the plenum chambers communicating with the induction system will occur. Thus, as with the previously described embodiments, damping is provided over a wider range of speeds.

In each of the described embodiments the invention has been illustrated as being used in conjunction with a two-cycle engine of the ported type. It is to be understood that the invention is equally adaptable for use with two-cycle engines having rotary or other type of valves that are driven by the crankshaft and also usable with four-cycle engines, either the ported or valved type.

By providing plenum chambers of varying volume, it is possible to damp pulsations in the intake system and generate a more even intake flow over wide engine speed requirements. Thus, pulsations can be damped and induction efficiency improved over a wide speed range. It is to be understood that various changes and modifications may be made in addition to those described without departing from the spirit and scope of the invention, as defined by the appended claims.

I claim:

1. In an induction system for an internal combustion engine having a chamber of variable volume, an intake passage for delivering a charge to the chamber, and throttle valve means for controlling the flow to the chamber through said intake passage, the improvement comprising plenum chamber means defining at least a first effective volume and a second effective volume different from said first effective volume and branch passage means communicating said plenum chamber means with said main induction passage between said throttle valve and said variable volume chamber, said branch passage means having an opening communicating with said induction passage of substantially smaller effective cross-sectional area than said induction passage.

2. An induction system as set forth in claim 1 wherein said plenum chamber means comprises first and second plenum chambers having different effective volumes.

3. An induction system as set forth in claim 1 wherein said plenum chamber means comprises first and second plenum chambers, said second plenum chamber communicates with the main induction passage through said first plenum chamber.

4. An induction system as set forth in claim 3 wherein a restricted passage provides communication of the second plenum chamber with the first plenum chamber.

5. An induction system as set forth in claim 3 wherein the volumes of the plenum chambers are different from each other.

6. An induction system as set forth in claim 5 wherein the volume of the second plenum chamber is no greater than the volume of the first plenum chamber.

7. An induction system as set forth in claim 6 wherein a restricted passage provides communication of the second plenum chamber with the first plenum chamber.

8. An induction system as set forth in claim 3 wherein the branch passage means comprises a branch passage interconnecting the first plenum chamber with the intake passage, the second plenum chamber being in communication with the first plenum chamber through a restricted passage in a common wall separating said chambers.

9. An induction system as set forth in claim 3 wherein the branch passage means comprises a conduit opening at one of its ends into the intake passage and extending for a major portion of its length through the first plenum chamber and terminating at its other end adjacent the opposite end of the first plenum chamber, the second plenum chamber being in communication with the first plenum chamber.

10. An induction system as set forth in claim 9 wherein the second plenum chamber communicates with the first plenum chamber through a restricted orifice.

11. An induction system as set forth in claim 2 wherein the branch passage means comprises a first branch passage communicating the first plenum chamber with the intake passage and a second branch passage interconnecting the second plenum chamber with the intake passage independently of the first branch passage.

12. An induction system for an internal combustion engine having a chamber of variable volume, an intake passage for delivering a charge to the chamber and throttle valve means for controlling the flow to the chamber through the intake passage, the improvement comprising a branch passage extending from the intake passage externally of the engine and a plenum chamber surrounding a substantial portion of the length of said branch passage, said branch passage being in communication with said plenum chamber at its other end.

13. In an induction system for an internal combustion engine having a chamber of variable volume, an intake passage for delivering a charge to the chamber, and throttle valve means for controlling the flow to the chamber through said intake passage, the improvement comprising plenum chamber means defining at least a first effective volume and a second effective volume different from said first effective volume and branch passage means communicating said plenum chamber means only with said main induction passage between said throttle valve and said variable volume chamber.

14. An induction system as set forth in claim 13 wherein said plenum chamber means comprises first and second plenum chambers having different effective volumes.

15. An induction system as set forth in claim 13 wherein said plenum chamber means comprises first and second plenum chambers, said second plenum chamber communicates with the main induction passage through said first plenum chamber.

16. An induction system as set forth in claim 15 wherein a restricted passage provides communication of the second plenum chamber with the first plenum chamber.

17. An induction system as set forth in claim 15 wherein the volumes of the plenum chambers are different from each other.

18. An induction system as set forth in claim 17 wherein the volume of the second plenum chamber is no greater than the volume of the first plenum chamber.

19. An induction system as set forth in claim 18 wherein a restricted passage provides communication of the second plenum chamber with the first plenum chamber.

20. An induction system as set forth in claim 15 wherein the branch passage means comprises a branch passage innerconnecting the first plenum chamber with the intake passage, the second plenum chamber being in communication with the first plenum chamber through a restricted passage in a common wall separating said chambers.

21. An induction system as set forth in claim 15 wherein the branch passage means comprises a conduit opening at one of its ends into the intake passage and extending for a major portion of its length through the first plenum chamber and terminating at its other end adjacent the opposite end of the first plenum chamber, the second plenum chamber being in communication with the first plenum chamber.

22. An induction system as set forth in claim 21 wherein the second plenum chamber communicates with the first plenum chamber through a restricted orifice.

23. An induction system as set forth in claim 14 wherein the branch passage means comprises a first branch passage communicating the first plenum chamber with the intake passage and a second branch passage interconnecting the second plenum chamber with the intake passage independently of the first branch passage.

24. In an induction system for an internal combustion engine having a chamber of variable volume, an intake passage for delivering a charge only to the chamber, and throttle valve means for controlling the flow to the chamber through said intake passage, the improvement comprising plenum chamber means defining at least a first effective volume and a second effective volume different from said first effective volume and branch passage means communicating said plenum chamber means with said main induction passage between said throttle valve and said variable volume chamber.

25. An induction system as set forth in claim 24 wherein said plenum chamber means comprises first and second plenum chambers having different effective volumes.

26. An induction system as set forth in claim 24 wherein said plenum chamber means comprises first and second plenum chambers, said second plenum chamber communicates with the main induction passage through said first plenum chamber.

27. An induction system as set forth in claim 26 wherein a restricted passage provides communication of the second plenum chamber with the first plenum chamber.

28. An induction system as set forth in claim 26 wherein the volumes of the plenum chambers are different from each other.

29. An induction system as set forth in claim 28 wherein the volume of the second plenum chamber is no greater than the volume of the first plenum chamber.

30. An induction system as set forth in claim 29 wherein a restricted passage provides communication of the second plenum chamber with the first plenum chamber.

31. An induction system as set forth in claim 26 wherein the branch passage means comprises a branch passage interconnecting the first plenum chamber with the intake passage, the second plenum chamber being in communication with the first plenum chamber through a restricted passage in a common wall separating said chambers.

32. An induction system as set forth in claim 26 wherein the branch passage means comprises a conduit opening at one of its ends into the intake passage and extending for a major portion of its length through the first plenum chamber and terminating at its other end adjacent the opposite end of the first plenum chamber, the second plenum chamber being in communication with the first plenum chamber.

33. An induction system as set forth in claim 32 wherein the second plenum chamber communicates with the first plenum chamber through a restricted orifice.

34. An induction system as set forth in claim 25 wherein the branch passage means comprises a first branch passage communicating the first plenum chamber with the intake passage and a second branch passage interconnecting the second plenum chamber with the intake passage independently of the first branch passage.

* * * * *